Patented Nov. 10, 1953

2,658,886

UNITED STATES PATENT OFFICE 2,658,886

PRODUCTION OF POLYURETHANES BY A CONTINUOUS PROCESS

Jack Swerdloff, Bloomfield, and Samuel B. McFarlane, Summit, N. J., assignors to Celanese Corporation of America, New York, N. Y., a corporation of Delaware No Drawing. Application October 6, 1951, Serial No. 250,187

12 Claims. (Cl. 260—77.5)

This invention relates to the production of polyurethanes and relates more particularly to a continuous process for the production of polyurethanes by the reaction of a polyamine and a bis-chloroformate.

This application is a continuation-in-part of our application S. No. 119,772, filed October 5, 1949, now abandoned.

An object of this invention is to provide a continuous process for the production of polyurethanes in high yield and of a molecular weight or chain length adapted for the production of commercially acceptable yarns, filaments and molded materials by suitable shaping operations.

Another object of this invention is the provision of a process for the production of polyurethanes involving the continuous reaction of an aqueous solution of a polyamine and an organic solvent solution of a bis-chloroformate whereby the continuous production of long chain polyurethanes may be effected.

A further object of this invention is to carry out said continuous polymerization reaction in an emulsion form whereby substantially complete reaction of the intermediates is achieved and a maximum yield of polyurethane is obtained.

Yet another object of this invention is the production of mixed polyurethanes by a process involving the continuous reaction of an aqueous solution of one or more polyamines with an organic solvent solution of one or more bis-chloroformates.

A still further object of this invention is the continuous production of pigmented polyurethanes wherein pigmentation is effected simultaneously with the polymerization of a polyamine and a bis-chloroformate.

Other objects of this invention will appear from the following detailed description and claims.

The reaction of a polyamine and a bis-chloroformate to produce a polyurethane has previously been effected by mixing the said two substances in the presence of an alkaline agent on a batch basis. The solid polymer which forms as the reaction proceeds is separated from the reaction medium and is then purified by a suitable washing procedure. This batch process not only suffers from the well known limitations of all batch processes, but yields a mixture of polyurethanes of widely different molecular weights. One cause tending to produce a mixture of polyurethanes of different molecular weights is the tendency of the alkaline agent, which is added to the reaction medium to neutralize the hydrochloric acid liberated during the polymerization, to produce a relatively rapid hydrolysis of the chloroformate group. The half hydrolysis of a bis-chloroformate produces a large number of so-called "chain stoppers" which, when they react with a growing polymer chain, will prevent a further growth of said chain. A similar interruption in the growth of the polymer chain will take place when the half hydrolysis of the bis-chloroformate occurs after one end of said bis-chloroformate has been linked to the polymer chain. In addition to interrupting the growth of the polymer chains and producing a mixture of polyurethanes of different molecular weights, the hydrolysis of the bis-chloroformate will reduce the yield of the polymer from a given quantity of starting materials and will produce impurities that will be occluded in the polymer mass and will make the purification thereof more difficult. These difficulties become especially serious when the production of the polymer is carried out on a batch basis on a scale adequate for commercial production.

We have now found that the production of polyurethanes by the reaction of a polyamine with a bis-chloroformate may be effected by a continuous process in such manner that the hydrolysis of the bis-chloroformate is reduced to relatively unimportant amounts and high yields of polyurethane polymer of high and relatively uniform molecular weight may be readily obtained. In accordance with our novel process, an aqueous solution of the polyamine, an organic solvent solution of the bis-chloroformate and an alkaline agent are introduced simultaneously and continuously into a reaction zone of relatively restricted volume wherein they are subjected to strong agitation so as to effect a thorough admixture and emulsification of the reactants. The agitation should be adequate to effect a substantially complete polymerization during the period in which the polyamine and bis-chloroformate pass through the reaction zone. Preferably, to assist in the emulsification, there is also introduced into the reaction zone an emulsifying agent. In the reaction zone, a rapid reaction takes place between the polyamine and the bis-chloroformate with the production of a high yield of finely divided, solid polyurethane of high and relatively uniform molecular weight. Generally, the reactants should pass through the reaction zone in a period of less than about 10 minutes or preferably in a period of from about 0.3 to 3.0 minutes. The solid polyurethane is continuously removed from the reaction zone in the form of a slurry at the same volumetric rate as the solutions are introduced into the reaction zone and may be recovered from the reaction medium in any suitable manner such as filtration, decantation, centrifuging, or the like. Due to the rapidity with which the reaction takes place and the relatively small volume of materials in the reaction zone, there is little opportunity for any appreciable hydrolysis of the bis-chloroformate to occur so that the difficulties referred to above as resulting from the hydrolysis of the bis-chloroformate are substantially avoided. In addition, because of the relatively small volume of the reaction zone, a high degree of emulsification of the reactants may be readily attained so that the reactants will be brought into contact with each other very rapidly.

The temperature of the solutions undergoing polymerization is advantageously maintained at from about 0 to 25° C. or 35° C. to obtain the maximum yield of polymer of high molecular weight. However, lower temperatures down to about −10° C. or even lower may also be employed by adding a suitable antifreeze agent such as methanol, ethylene glycol, glycerine, acetone or dioxane to the aqueous polyamine solution and employing an organic solvent having a freezing point below the temperature at which the polymerization is carried out for forming the bis-chloroformate solution. Higher temperatures may also be employed for carrying out the polymerization, but are somewhat less desirable in that they result in a lower yield of polymer having a lower and less uniform molecular weight.

The rate of flow of the aqueous polyamine solution and the organic solvent bis-chloroformate solution through the reaction zone will depend in large part upon the efficiency with which said solutions are stirred in said zone. For example, with a reaction zone having a volume of about 73.2 cubic inches and equipped with an air stirrer driven at 4100 R. P. M., substantially complete polymerization may be achieved when a total of from about .38 to 2.3 volumes of solution are passed through the reaction zone per minute per volume of free reactor space. With more efficient stirring, up to 3.5 or even more, total volumes of solution may be passed through the reaction zone per minute per volume of free reactor space. The volumes of solution passing through the reaction zone may include a small volume of water which serves to dilute the slurry formed in the event that mechanical difficulties are encountered in handling the same. The aqueous polyamine solution and the organic solvent bis-chloroformate solution should, in general, have a high concentration to reduce to a minimum the volume of material that must be handled for the production of a given amount of polyurethane. The concentration of the solutions is, however, limited by the mechanical problems involved in handling the polymer slurry which is formed. For example, with the reaction zone specified above and employing a siphon tube $3\frac{1}{16}$ inches in diameter operating under a head of 8½ inches, solutions having a concentration of between about 0.2 and 1.0 moles per liter of reactants have proved satisfactory. With more efficient and more positive slurry handling means, such as pumps and the like, solutions having a concentration of up to about 1.5, or even more, moles per liter of reactants may be employed. It is preferred, for reasons of economy to employ substantially equimolecular amounts of the polyamine and bis-chloroformate. This is not essential, however, it having been found that, contrary to most polymerization reactions, a large excess of one reactant or the other will not materially affect the molecular weight of the polymer. The use of a small excess of polyamines may even be desirable to give higher yields and higher molecular weights.

In forming the organic solvent solution of the bis-chloroformate, there may be employed a wide variety of water-immiscible solvents. Suitable materials for this purpose include benzene, toluene, xylene, chloroform, carbon tetrachloride, octane, naphthene and the hydrocarbon mixture of aromatics, paraffins and naphthalenes sold under the name "Varsol." Aromatic solvents, particularly toluene, are preferred for this purpose since they yield a maximum yield of polymer of the desired molecular weight.

During the polymerization reaction, hydrochloric acid is liberated and reacts with the alkaline agent that is introduced into the reaction zone together with the polyamine and the bis-chloroformate. Preferably, the alkaline agent is employed in excess of that required exactly to neutralize all of the hydrochloric acid formed. Depending upon the specific alkaline agent, the optimum results with regard to yield are obtained with a molar excess of up to about 75%. For example, when sodium hydroxide is employed as the alkaline agent, the molar excess should preferably range from about 0 to 10%. When sodium carbonate is the alkaline agent, the molar excess should preferably range from about 10 to 75%. Suitable alkaline agents that may be employed, in addition to sodium hydroxide and sodium carbonate, are an excess of the polyamine itself, the soluble alkali metal or alkaline earth metal oxides, hydroxides and carbonates, such as potassium hydroxide, barium hydroxide, disodium phosphate and trisodium phosphate, quaternary ammonium bases and the like. The alkaline agent may be dissolved in the aqueous polyamine solution before the latter is introduced into the reaction zone, or it may be introduced into the reaction zone in the form of a separate solution.

Various types of emulsifying agents may be introduced into the reaction zone, either in solution with one of the reactants or separately, to assist in effecting a uniform and rapid emulsification of the reactant solutions. Examples of suitable emulsifying agents are ethylene oxide condensates with long chain fatty alcohols, esters of sodium sulfosuccinic acid such as the dioctyl ester, long chain fatty acid esters of polyethylene glycol, ethylene oxide condensates with castor oil, long chain monoglycerides, alkyl aryl polyether alcohols, e. g. the reaction product of ethylene oxide and xylenol, sorbitan monolaurate, the condensation product of sorbitan monolaurate with ethylene oxide, mono- or poly-alkyl naphthalene sulfonates, sulfates of fatty acid monoglycerides or the glycol esters of long chain fatty acids. It is important, for the production of polymers of good color, that the emulsifying agent be as free as possible of colored bodies as the polymer tends to scavenge colored bodies from the emulsifying agent and the reaction mixture. The most advantageous results are obtained, however, by employing emulsifying agents comprising the sodium salts of sulfated long chain alcohols, such as sodium lauryl sulfate, sodium octyl sulfate, sodium oleyl sulfate and the like. Other emulsifying agents that may be employed include the sodium salt of an N-substituted aminoethane-sulfonic acid, i. e. an N-substituted taurine. The substituents on the nitrogen may include both alkyl groups, such as methyl, ethyl, propyl, butyl, amyl, hexyl, heptyl, octyl, decyl, undecyl, dodecyl, etc., and acidyl groups. The acidyl group, when present, is preferably the acidyl group of a long chain saturated or unsaturated aliphatic acid containing six to eighteen carbon atoms. Examples of said acids are lauric, oleic, ricinoleic, linoleic, caproic, pimelic, heptylic, undecylic and stearic acid. Good results are achieved by employing the sodium salt of N-butyl, N-lauroyl-β-amino-ethane sulfonic acid as the emulsifying agent. The amount of emulsifying agent employed is preferably from about 4.5 to 10.5 grams/gram mole of reactants on a 100% strength basis.

Examples of diamines which may be employed in forming polyurethanes in accordance with the novel polymerization process of our invention are ethylene diamine, trimethylene diamine, tetramethylene diamine, pentamethylene diamine, hexamethylene diamine, ortho- meta- or para-phenylene diamine, cyclohexylene diamine and nuclearly substituted-phenylene diamines and nuclearly substituted-cyclohexylene diamines. N-substituted diamines which contain a free amino hydrogen on each amino group are also suitable.

Other diamines which may also be employed are, for example, $\alpha,\omega$-di-(3-aminopropoxy)-alkanes, such as 1,4-di-(3-aminopropoxy)-butane, bis-($\omega$-amino-alkyl) ethers such as 3,3'- diamino-di-propyl-ether, 4,4'-diamino-dicyclohexyl methane, bis-($\omega$-amino-alkyl) sulfides such as 2,2'-diamino-di-ethyl-sulfide, 1,2-, 1,3- or 1,4-$\alpha,\alpha'$-diamino xylene or other $\omega,\omega'$-diamino-dialkyl benzene, diamino-naphthalene, diamino-biphenyl, $\omega,\omega'$-diamino-dialkyl biphenyls, $\omega$-amino-alkyl anilines, $\omega$-amino-alkyl cyclohexylamines, bis-($\omega$-amino-alkoxy)-benzene, bis-($\omega$-amino-alkoxy)-cyclohexane; 4,4'-diamino-dicyclohexyl sulfones, $\omega,\omega'$-sulfonyl-bis-alkyl amines, diamino-diphenyl sulfones, diamino-benzophenones and N,N'-bis-($\omega$-amino-alkyl)-$\alpha,\omega$-alkane disulfonamides. Amines containing more than two reactive amino groups, either primary or secondary, such as diethylene triamine or triethylene tetramine, for example, yield branch chain polyurethanes. Such polymers, if they contain moderately branched chains, are of relatively low melting point. If the chains are highly branched the polymers approach and may even reach substantial infusibility.

The bis-chloroformates which are reacted with the above mentioned diamines may be obtained by reacting phosgene, i. e. carbonyl chloride, with a diol. The bis-chloroformates of diols such as ethylene glycol, trimethylene glycol and 1,4-butanediol, for example, are suitable. Higher glycols wherein the alkylene chain contains a greater number of carbon atoms and may be a straight chain or a branched chain are also satisfactory. Examples of other diols whose bis-chloroformates may be employed are $\omega,\omega'$-dihydroxyl-dialkyl ethers, $\omega,\omega'$-dihydroxy-dialkyl thioethers, bis-glycol or diglycol esters of straight chain or branched chain aliphatic dicarboxylic acids such as the bis-ethylene glycol ester of succinic acid, the bis-diethylene glycol ester of succinic acid, the bis-ethylene glycol ester of glutaric acid, the bis-ethylene glycol ester of adipic acid, the bis-ethylene glycol ester of pimelic acid, the bis-ethylene glycol ester of suberic acid, azelaic acid or sebacic acid, the diol, dimer or trimer esters obtained by the conversion of an excess of an aliphatic glycol with a dicarboxylic acid of the several aliphatic dicarboxylic acids mentioned above, $\omega,\omega'$-di-hydroxy-dialkyl ethers of hydroquinone, $\omega,\omega'$-dihydroxy dialkyl ethers of di-hydroxy cyclohexane, $\omega,\omega'$-sulfonyl bis-alkanols, i. e. bis-($\omega$-hydroxyalkyl-sulfones), N,N'-($\omega$-hydroxyalkyl)-dicarboxyamides such as N,N'-($\beta,\beta'$-dihydroxy-diethyl)-adipamide, cycloaliphatic glycols as cyclohexylene glycol, dihydroxy tetrahydrofurane, hydroxy-hydroxymethyl furane, hydroxy-hydroxymethyltetrahydrofurane, and dihydroxy-oxathiane dioxide.

Thus, the polyurethane may contain an alkylene linkage of two, three, four, five or more carbon atoms alternating with an alkylene linkage of two, three, four, five or more carbon atoms. For ready identification, the alkylene polyurethanes may be identified as 2,4-, 3,4-, 4,4-, 5,6-, 6,6-, etc. polyurethanes, the former numeral referring to the carbon chain length of the diamine employed while the latter refers to the carbon chain length of the bis-chloroformate. Mixed polyurethanes containing any type of intermediate linkage or grouping as brought out above may also be formed by employing any of the diamines and bis-chloroformate of the diols mentioned or a mixture of two or more different diamines or two or more different bis-chloroformates.

Pigmented polyurethanes may be readily obtained by introducing continuously into the reaction zone a slurry or dispersion of a suitable pigment such as titanium dioxide, Franconia blue, Opaline green, or Carlon black.

In order further to illustrate our invention, but without being limited thereto, the following examples are given:

*Example I*

35.2 parts by weight of tetramethylene diamine are dissolved in 1000 parts by weight of water containing 63.6 parts by weight of sodium carbonate (50% mol excess) and 6 parts by weight of sodium lauryl sulfate (30% strength). 86 parts by weight of 1,4-butanediol bis-chloroformate are dissolved in 900 parts by weight of toluene and both solutions separately cooled to a temperature of 20° C. The cooled solutions are then simultaneously introduced into a reaction zone having 500 volumes of free reactor space and provided with means to effect strong agitation, such as a high speed stirrer, the aqueous solution being introduced into the reactor at a rate of 80 volumes per minute and the toluene solution being introduced at a rate of 87 volumes per minute. Polymerization with the formation of 4,4-polyurethane takes place immediately as the separate solutions are brought together. The polymer formed precipitates from solution. The resulting reaction mixture containing the suspended polymer is withdrawn from the reaction zone at the same rate at which the fresh solutions are introduced, the polymer separated by filtration, washed with acetone and water to remove occluded solvent and inorganic salts and dried. The yield of 4,4-polyurethane polymer obtained is 80% of theory and the polymer thus formed has an intrinsic viscosity of 1.29.

*Example II*

35.2 parts by weight of tetramethylene diamine are dissolved in 1000 parts by weight of water containing 53 parts by weight of sodium carbonate and 16 parts by weight of sodium alkyl naphthalene sulfonate (30% strength). 86.8 parts by weight of 1,4-butanediol-bis-chloroformate are dissolved in 900 parts by weight of mineral spirits comprising a mixture of petroleum hydrocarbons boiling within the range of 300 to 410° F. and sold commercially under the name of "Varsol #1" and both solutions separately cooled to a temperature of 20° C. The cooled solutions are then introduced simultaneously, and with strong agitation, into a reaction zone having 500 volumes of free reactor space, the amine solution being introduced at a rate of 149 volumes per minute and the 1,4-butanediol-bis-chloroformate solution at a rate of 157 volumes per minute. A yield of 85% of a filament-forming polymer having an intrinsic viscosity of 1.26 is obtained.

Example III 35.2 parts by weight of tetramethylene diamine are dissolved in 1000 parts by weight of water containing 70.2 parts by weight of sodium carbonate (60% mol excess) and 35 parts by weight of sodium lauryl sulfate (30% strength). 103.2 parts by weight of 1,4-butanediol bis-chloroformate are dissolved in 900 parts by weight of toluene and both solutions then separately cooled to 20° C. The cooled solutions are then simultaneously introduced into a reactor having 500 volumes of free reactor space and provided with means for stirring at high speed. The diamine solution is introduced into the reactor at a rate of 150 volumes per minute and the bis-chloroformate solution at a rate of 155 volumes per minute. A yield of filament-forming polymer of 88% is obtained having an intrinsic viscosity of 0.93.

Example IV 88 parts by weight of tetramethylene diamine (1.0 mol) are dissolved in 1000 parts by weight of water containing 159 parts by weight of sodium carbonate (50% mol excess) and 30 parts by weight of a sodium lauryl sulfate emulsifying agent (30% strength). 215 parts by weight of 1,4-butanediol bis-chloroformate are dissolved in 900 parts by weight of toluene and both solutions separately cooled to a temperature of 20° C. The cooled solutions are then simultaneously introduced into a reaction zone having 500 volumes of free reactor space and provided with means, such as a high speed stirrer, so as to effect strong agitation, the aqueous solution being introduced into the reactor at a rate of 80 volumes per minute and the toluene solution being introduced at a rate of 87 volumes per minute. Polymerization with the formation of a 4,4-polyurethane takes place immediately as the separate solutions are brought together and the polymer formed precipitates from solution. The resulting reaction mixture is withdrawn from the reaction zone at the same rate at which the fresh solutions are introduced, the polymer separated by filtration, washed with water to remove occluded inorganic salts and dried. The yield of 4,4-polyurethane is 87% of theory and the polymer is found to have an intrinsic viscosity of 1.45.

Example V 88 parts by weight of tetramethylene diamine are dissolved in 1000 parts by weight of water containing 160 parts by weight of sodium carbonate and 40 parts by weight of sodium lauryl sulfate (30% strength). 215 parts by weight of 1,4-butanediol bis-chloroformate are dissolved in 900 parts by weight of toluene and both solutions are separately cooled to a temperature of 20° C. The cooled solutions are then introduced into a reactor having agitating means and containing 500 volumes of free reactor space, the solutions each being added at a rate of 150 volumes per minute. The reaction mixture formed is thoroughly agitated in the reaction zone and is withdrawn, together with the polymer formed, at a rate equal to that at which solutions are introduced. The polymer formed is obtained in a yield of 81% of theory and has an intrinsic viscosity of 1.67.

Example VI

A polyurethane polymer is formed in the manner described in Example V employing, however, a mineral spirits solvent, "Varsol #1," in lieu of toluene. The polymer formed is obtained in a yield of 83% of theory. The polymer has an intrinsic viscosity of 1.08.

Example VII 79 parts by weight of a commercial 76% aqueous solution of ethylene diamine is dissolved in 981 parts by weight of water containing 160 parts by weight of sodium carbonate (50% mol excess) and 30 parts by weight of sodium lauryl sulfate (50% strength). 215 parts by weight of 1,4-butanediol bis-chloroformate are dissolved in 900 parts by weight of toluene. The solutions are cooled separately to 20° C. and introduced simultaneously into a stirrer-equipped reactor having 500 volumes of free reactor space, the diamine solution being introduced at a rate of 80 volumes per minute and the bis-chloroformate solution at a rate of 87 volumes per minute. The agitated reaction product mixture is withdrawn from the reactor at the same rate at which the solutions are introduced. The polymer formed is obtained in a yield of 82% of theory and has an intrinsic viscosity of 1.01.

Example VIII 59.6 parts by weight of a 76% aqueous solution of ethylene diamine and 22 parts by weight of tetramethylene diamine are dissolved in 986 parts by weight of water containing 160 parts by weight of sodium carbonate (50% mol excess) and 30 parts by weight of sodium lauryl sulfate (30% strength). 215 parts by weight of 1,4-butanediol bis-chloroformate are dissolved in 900 parts by weight of toluene and, after cooling both solutions to 20° C. they are simultaneously introduced into a reactor equipped with a stirrer and having 500 volumes of free reactor space. The diamine solution is introduced at a rate of 80 volumes per minute and the bis-chloroformate solution introduced at a rate of 87 volumes per minute. The reaction mixture containing the polymer formed is withdrawn from the reactor at the same rate at which the combined solutions are introduced. The polymer which is obtained in a yield of 78% of theory, has an intrinsic viscosity of 1.70.

Example IX 8.8 parts by weight of tetramethylene diamine (0.1 mols) and 54 parts by weight of ethylene diamine (0.9 mols) are dissolved in 1000 parts by weight of water containing 159 parts by weight of sodium carbonate (50% mol) excess and 30 parts by weight of a sodium lauryl sulfate emulsifying agent (30% strength). 215 parts by weight of 1,4-butanediol bis-chloroformate are dissolved in 900 parts by weight of toluene and both solutions separately cooled to a temperature of 20° C. The cooled solutions are then simultaneously introduced into a reaction zone having 500 volumes of free reactor space and provided with means, such as a high-speed stirrer so as to effect strong agitation, the aqueous solution being introduced into the reactor at a rate of 80 volumes per minute and the toluene solution being introduced at a rate of 87 volumes per minute. Polymerization with the formation of a mixed 2,4 and 4,4-polyurethane takes place immediately as the separate solutions are brought together and polymer formed precipitates from solution. The resulting reaction mixture is withdrawn from the reaction zone at the same time at which the fresh solutions are introduced, the polymer separated by filtration, washed with water to remove occluded inorganic salts and dried. The yield of mixed polyurethane obtained is 84% of theory and the polymer thus formed has an intrinsic viscosity of 1.25.

*Example X*

30 parts by weight of titanium dioxide are milled in a ball mill for 24 hours with 300 parts by weight of water and 2 parts by weight of a 30% aqueous solution of sodium lauryl sulfate (30% strength). 2.7 parts by weight of this titanium dioxide concentrate are added to 1800 parts by weight of water to form a dispersion. A polymer is formed following the procedure of Example IV with 150 volumes per minute of the titanium dioxide dispersion being added to the reactor as a third component, together with the diamine and bis-chloroformate. A pigmented polymer having an intrinsic viscosity of 1.38 is obtained in a yield of 88%. The pigmented polymer may be readily melt-spun into filaments and the pigment seems to facilitate the spinning operation.

*Example XI*

30 parts by weight of Franconia blue (a phthalocyanine blue pigment) are milled for 24 hours in a ball mill with 300 parts by weight of water containing 2 parts by weight of a 30% solution of sodium lauryl sulfate (30% strength). 2.2 parts by weight of this pigment concentrate are added to 1800 parts by weight of water to form an aqueous pigment dispersion. This dispersion is employed in forming a polymer in the manner described in Example X, 150 volumes per minute of the blue pigment dispersion being added as a third component in forming the polymer in place of the titanium dioxide dispersion employed therein. A blue polymer having an intrinsic viscosity of 1.4 is obtained in a yield of 86% of theory. The polymer may be molded or spun into uniformly colored articles or filaments.

*Example XII*

88 parts by weight of tetramethylene diamine are dissolved in 1000 parts by weight of water containing 88 parts by weight of sodium hydroxide and 15 parts by weight of sodium lauryl sulfate (30% strength). 215 parts by weight of 1,4-butanediol bis-chloroformate are dissolved in 900 parts by weight of toluene and both solutions are separately cooled to a temperature of 20° C. The cooled solutions are then introduced into a reactor having agitating means and containing 500 volumes of free reactor space, the solutions each being added at a rate of 150 volumes per minute. The reaction mixture formed is thoroughly agitated in the reaction zone and is withdrawn, together with the polymer formed, at a rate equal to that at which the solutions are introduced. The polymer formed is obtained in a yield of 81% of theory and has an intrinsic viscosity of 0.93.

It is to be understood that the foregoing detailed description is given merely by way of illustration and that many variations may be made therein without departing from the spirit of our invention.

Having described our invention, what we desire to secure by Letters Patent is:

1. Process for the production of polyurethanes, which comprises continuously introducing into a reaction zone an organic solvent solution of at least one bis-chloroformate free from reactive groups other than the chloroformate groups, an aqueous solution of a polyamine free from reactive groups other than the amino groups and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

2. Process for the production of polyurethanes, which comprises continuously introducing into a reaction zone a water-immiscible organic solvent solution of at least one bis-chloroformate free from reactive groups other than the chloroformate groups, an aqueous solution of a polyamine free from reactive groups other than the amino groups and having a free amino hydrogen on at least two amino groups and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

3. Process for the production of polyurethanes, which comprises continuously introducing into a reaction zone a water-immiscible organic solvent solution of at least one bis-chloroformate free from reactive groups other than the chloroformate groups, an aqueous solution of a polyamine free from reactive groups other than the amino groups and having a free amino hydrogen on at least two amino groups, an emulsifying agent and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through the reaction zone at a rate such that the reactants remain in said zone for a period of between about 0.3 and 3.0 minutes and the degree of stirring in said reaction zone being sufficient to cause a substantially complete polymerization during the passage of the reactants through said zone.

4. Process for the production of polyurethanes, which comprises continuously introducing into a reaction zone a water-immiscible organic solvent solution of at least one bis-chloroformate free from reactive groups other than the chloroformate groups, an aqueous solution of a polyamine free from reactive groups other than the amino groups and having a free amino hydrogen on at least two amino groups, an emulsifying agent and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 3 minutes and the degree of stirring and the period of time the reactants remain in said reaction zone being sufficient to cause a substantially complete polymerization during the passage of the reactants through said zone.

5. Process for the production of polyurethanes, which comprises continuously introducing into a reaction zone an organic solvent solution of at least one bis-chloroformate free from reactive groups other than the chloroformate groups and having a concentration of between about 0.2 to 1.5 moles per liter, an aqueous solution of a polyamine free from reactive groups other than the amino groups and having a free amino hydrogen on at least two amino groups and having a concentration of between about 0.2 to 1.5 moles per liter and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

6. Process for the production of polyurethanes, which comprises continuously introducing into a reaction zone maintained at a temperature of between about —10° C. and 35° C. an organic solvent solution of at least one bis-chloroformate free from reactive groups other than the chloroformate groups, an aqueous solution of a polyamine free from reactive groups other than the amino groups and having a free amino hydrogen on at least two amino groups and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

7. Process for the production of polyurethane, which comprises continuously introducing into a reaction zone an organic solvent solution of at least one bis-chloroformate free from reactive groups other than the chloroformate groups, an aqueous solution of a polyamine free from reactive groups other than the amino groups and having a free amino hydrogen on at least two amino groups and up to about a 75% molar excess of an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

8. Process for the production of polyurethanes, which comprises continuously introducing into a reaction zone maintained at a temperature of between about —10 and 35° C. a water-immiscible organic solvent solution of at least one bis-chloroformate free from reactive groups other than the chloroformate groups, an aqueous solution of a polyamine free from reactive groups other than the amino groups and having a free amino hydrogen on at least two amino groups, an emulsifying agent and up to about a 75% molar excess of an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of between about 0.3 and 3.0 minutes and the degree of stirring in said reaction zone being sufficient to cause a substantially complete polymerization during the passage of the reactants through said zone.

9. Process for the production of polyurethanes, which comprises continuously introducing into a reaction zone an organic solvent solution of at least one bis-chloroformate free from reactive groups other than the chloroformate groups, an aqueous solution of a polyamine free from reactive groups other than the amino groups and having a free amino hydrogen on at least two amino groups, a pigment and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

10. Process for the production of polyurethanes, which comprises continuously introducing into a reaction zone a water-immiscible organic solvent solution of at least one polyalkylene bis-chloroformate free from reactive groups other than the chloroformate groups, an aqueous solution of a polyalkylene polyamine free from reactive groups other than the amino groups and having a free amino hydrogen on at least two amino groups, an emulsifying agent and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 3 minutes and the degree of stirring and the period of time the reactants remain in said reaction zone being sufficient to cause a substantially complete polymerization during the passage of the reactants through said zone.

11. Process for the production of 4,4-polyurethane which comprises continuously introducing into a reaction zone an organic solvent solution of 1,4-butanediol bis-chloroformate, an aqueous solution of tetramethylene diamine and an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of less than about 10 minutes and the degree of stirring and the period of time the reactants remain in said reaction zone being sufficient to cause a substantially complete polymerization during the passage of the reactants through said zone.

12. Process for the production of 4,4-polyurethane which comprises continuously introducing into a reaction zone maintained at a temperature of between about −10 and 35° C. a water-immiscible organic solvent solution of 1,4-butanediol bis-chloroformate, an aqueous solution of tetramethylene diamine, an emulsifying agent and up to about a 75% molar excess of an alkaline agent, effecting a polymerization reaction in said zone by continuously and strongly agitating the mixture therein, and continuously withdrawing a slurry of polyurethane polymer from said reaction zone at a volumetric rate equal to the volumetric rate at which the solutions are introduced therein, the said solutions being passed through said reaction zone at a rate such that the reactants remain in said zone for a period of between about 0.3 to 3.0 minutes and the degree of stirring in said reaction zone being sufficient to cause a substantially complete polymerization during the passage of the reactants through said zone.

JACK SWERDLOFF.
SAMUEL B. McFARLANE.

References Cited in the file of this patent

UNITED STATES PATENTS

| Number | Name | Date |
|---|---|---|
| 2,130,948 | Carothers | Sept. 20, 1938 |
| 2,361,717 | Taylor | Oct. 31, 1944 |
| 2,363,951 | Fikentscher | Nov. 28, 1944 |

FOREIGN PATENTS

| Number | Country | Date |
|---|---|---|
| 892,361 | France | Jan. 7, 1944 |
| 53,325 | France | Jan. 22, 1945 |
| | (first addition to No. 892,361 | |